Oct. 9, 1923.

H. R. GOGAY 1,469,952

SELF CLOSING RECEPTACLE

Filed Oct. 5, 1921

INVENTOR:
Henry R. Gogay
BY
Edward Conger Brown
ATTORNEY

Patented Oct. 9, 1923.

1,469,952

UNITED STATES PATENT OFFICE.

HENRY R. GOGAY, OF COLUMBUS, OHIO, ASSIGNOR TO SOLAR-STURGES MFG. CO., A CORPORATION OF ILLINOIS.

SELF-CLOSING RECEPTACLE.

Application filed October 5, 1921. Serial No. 505,525.

*To all whom it may concern:*

Be it known that I, HENRY R. GOGAY, a subject of the King of Great Britain and Ireland, and a resident of Columbus, in the State of Ohio, have invented certain new and useful Improvements in Self-Closing Receptacles, of which the following is a specification.

The invention relates to self closing receptacles, such as may be used as sanitary containers for refuse and the like, and has for some of its principal objects to provide such a receptacle which shall be simple in construction and convenient in operation, in which the contents shall be kept out of sight, and which shall be provided with a cover, easily opened to permit the deposit in the receptacle of refuse and similar materials, but which when released shall automatically close so as to conceal the contents of the receptacle, thereby presenting a more sightly appearance and also preventing the escape of odor from the refuse.

The invention consists in the novel construction, arrangement and combination of various devices, elements and parts, as set forth in the claims hereof, one embodiment of the same being shown in the accommpanying drawings and fully described in this specification.

Figure 1:
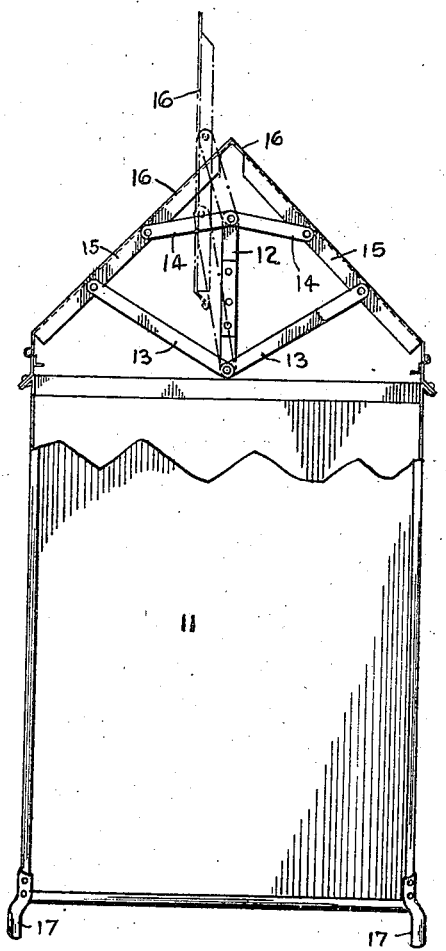
Figure 2:
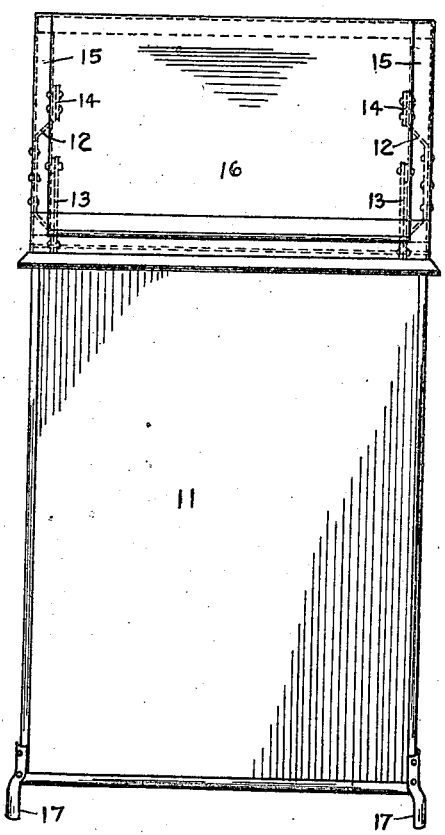

In the said drawings, Fig. 1 is a side view, showing one of the forms in which a receptacle embodying my invention may be constructed, the upper part of one side being shown broken away so as to disclose the interior mechanism for supporting the cover and allowing it to open and close; and Fig. 2 is a front view of the same, showing the cover supporting mechanism in dotted lines.

In carrying my invention into effect, in the embodiment thereof which I have selected for illustration in the accompanying drawings and description in this specification, I provide a receptacle 11, which may be provided with a door (not shown) to permit the convenient removal of the contents of the receptacle.

The upper part of the receptacle is preferably formed as shown in the drawings, the front and rear converging until they meet at the top, an opening being left, however, the same being filled in by the cover plates 16, which are movably secured to the receptacle as hereinafter described. The sides of the upper part of the receptacle are approximately triangular in shape, as will be readily understood.

On the inside of each of the said triangular side pieces, and secured thereto by rivets or in any suitable manner as will be seen in the drawings, is a supporting member 12, the upper and lower ends of which are bent inwards so as to leave an appreciable space between them and the sides of the receptacle, to the lower ends of the members 12 are pivoted the inner ends of links 13, and to the upper ends of the members 12 are pivoted the inner ends of links 14. The outer ends of the links 13 and 14 are pivoted to angle-irons 15 which are secured to the inner sides of the cover-plates 16. The lower edges of the cover-plates 16 rest, when the covers are closed, against the upper part of the receptacle walls, in the position shown in the full lines in the drawing, and when the cover is raised or opened, the cover-plates and the connected parts occupy the position shown in the dotted lines in Fig. 1, remaining in that position however only so long as they are held there, and upon being released, they automatically fall into the closed position.

The receptacle may if desired be provided with supporting legs or feet 17 to raise the same somewhat above the ground or floor, thereby saving wear and tear on the bottom of the receptacle.

The operation of the invention will be evident from a mere inspection of the drawings. It will be seen that the relative lengths of the links 13 and 14 are so chosen that when the cover-plates are lifted up into their open position, the same assume an approximately vertical position, so as to leave the opening into the receptacle free and unobstructed, whereas when the cover plates are allowed to swing downward, the same are tilted into an inclined position shown in Fig. 1.

The links are so contrived that the upward edges of the closure move in generally vertical directions so as not to interfere with each other. The lower edges move inward in a generally horizontal but slightly upwardly inclined path. Thus both closures may be opened simultaneously or successively and when open lie so close together as to offer the maximum available opening.

The advantages of my invention will be obvious from what has been above said as to its construction and operation.

I do not limit myself to the particular form shown and described in this application, as it is obvious that various modifications in detail may be made without departing from the spirit and scope of my invention.

Having thus described my invention what I claim as new and desire to secure by Letters Patent is as follows:

1. The combination of a receptacle having an opening; a closure serving to close said opening; and supporting and guiding means for the closure including unequal links pivotally supported within the receptacle and pivotally supporting the closure, said links being constructed and arranged to guide said closure from closed position to an open position in which the closure stands adjacent one edge of said opening and projects through the same.

2. The combination of a receptacle having an inclined top provided with an opening; a closure serving to close said opening; and supporting and guiding means for the closure including unequal links pivotally supported within the receptacle to swing in vertical planes, and pivotally supporting the closure, said links being constructed to guide said closure in a generally upward direction from closed position to an open position in which the closure stands in a substantially vertical position and extends through said opening adjacent the upper side thereof.

3. The combination of a receptacle having reversely inclined top portions meeting in a ridge and each inclined portion provided with an opening extending to said ridge and there merging into the opening in the other inclined portion; closures, one for each said opening, said closures being constructed and arranged to lie when closed substantially in the planes of corresponding inclined top portions and to abut against each other; and independent supporting and guiding means for each closure, including two sets of unequal links, one set for each closure, similar links of the two sets being concentrically pivoted within the receptacle to swing in vertical planes, and pivotally connected to corresponding closures, said sets of links being constructed and arranged to guide the upper edge of each corresponding closure in a generally vertical direction, and the lower edge in an inward generally horizontal direction to open positions in which the closures stand substantially vertically adjacent each other.

4. In a receptacle for refuse and the like, the combination with a body portion provided with an interior supporting member on each side, links pivotally attached at their inner ends respectively to the upper and lower ends of said supporting member, and a cover pivotally attached to the outer ends of said links.

5. In a receptacle for refuse and the like, the combination with a body portion provided with an interior supporting member on each side, links pivotally attached at their inner ends respectively to the upper and lower ends of said supporting member, and a cover pivotally attached to the outer ends of said links: the lower of said links being longer than the upper of said links, whereby when said cover is swung down it lies in a slanting position but when swung up it stands in an approximately perpendicular position.

Signed this 22 day of September, 1921.

HENRY R. GOGAY.